(12) United States Patent
Hsieh et al.

(10) Patent No.: US 11,533,149 B2
(45) Date of Patent: Dec. 20, 2022

(54) TECHNIQUES OF REDUCING SCELL ACTIVATION DELAY

(71) Applicant: MEDIATEK INC., Hsinchu (TW)

(72) Inventors: Chi-Hsuan Hsieh, Hsinchu (TW); Chiao-Yao Chuang, Hsinchu (TW); Din-Hwa Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 17/761,260

(22) PCT Filed: Sep. 30, 2020

(86) PCT No.: PCT/CN2020/119454
§ 371 (c)(1),
(2) Date: Mar. 17, 2022

(87) PCT Pub. No.: WO2021/063400
PCT Pub. Date: Apr. 8, 2021

(65) Prior Publication Data
US 2022/0271899 A1     Aug. 25, 2022

Related U.S. Application Data

(60) Provisional application No. 62/910,601, filed on Oct. 4, 2019.

(51) Int. Cl.
*H04L 5/00* (2006.01)
*H04W 72/12* (2009.01)

(52) U.S. Cl.
CPC ....... *H04L 5/0053* (2013.01); *H04W 72/1278* (2013.01)

(58) Field of Classification Search
CPC ............ H04L 5/0053; H04W 72/1278; H04W 74/008; H04W 76/11
See application file for complete search history.

(56) References Cited

U.S. PATENT DOCUMENTS

2019/0150161 A1   5/2019  Cheng et al.
2019/0312621 A1*  10/2019 Nam .................... H04W 76/27
(Continued)

FOREIGN PATENT DOCUMENTS

CN         110166192 A      8/2019
CN    WO 2021026906    *  8/2019 ........... H04L 1/0025

OTHER PUBLICATIONS

International Search Report and Written Opinion dated Dec. 30, 2020, issued in application No. PCT/CN2020/119454.
(Continued)

*Primary Examiner* — Christopher M Crutchfield
*Assistant Examiner* — Abusayeed M Haque
(74) *Attorney, Agent, or Firm* — McClure, Qualey & Rodack, LLP

(57) ABSTRACT

A method, a computer-readable medium, and an apparatus are provided. The apparatus may be a UE. The UE receives, on a primary cell, an activation command from a base station for activating a secondary cell between the UE and the base station. The UE receives scheduling information of a set of aperiodic TRSs. The UE receives a trigger indicating transmission of the set of aperiodic TRSs. The UE initiates a RF chain of the UE configured for the secondary cell in an interruption period. The UE receives, in response to receiving the trigger and in accordance with the scheduling information, the set of aperiodic TRSs on the secondary cell prior to receiving an initial SSB or an initial periodic TRS after the interruption period. The UE performs time and frequency tracking on the secondary cell based on the set of aperiodic TRSs.

20 Claims, 11 Drawing Sheets

(56) References Cited

U.S. PATENT DOCUMENTS

2019/0357085 A1* 11/2019 Chervyakov ......... H04L 1/0009
2020/0154287 A1*  5/2020 Novlan ................. H04W 24/02
2020/0413478 A1   12/2020 Si et al.
2021/0045184 A1*  2/2021 Sato ..................... H04L 5/0053

OTHER PUBLICATIONS

Qualcomm Incorporated; "Fast SCG and SCell Activation;" 3GPP TSG-RAN WG1 #97, R1-1907306; May 2019; pp. 1-11.
Ericsson; "Summary#2 of Efficient and low latency serving cell configuration/activation/setup;" 3GPP TSG RAN WG1 Meeting #96bis, R1-1905900; Apr. 2019; pp. 1-10.
VIVO; "Efficient Scell activation;" 3GPP TSG RAN WG1 #97, R1-1906184; May 2019; pp. 1-4.

* cited by examiner

TECHNIQUES OF REDUCING SCELL ACTIVATION DELAY

CROSS-REFERENCE TO RELATED APPLICATION(S)

This application claims the benefits of U.S. Provisional Application Ser. No. 62/910,601, entitled "INVENTION ON THE SOLUTION TO REDUCE SCELL ACTIVATION DELAY IN NR" and filed on Oct. 4, 2019, which is expressly incorporated by reference herein in their entirety.

FIELD

The present disclosure relates generally to communication systems, and more particularly, to techniques of reducing secondary cell (SCell) activation delay at a user equipment (UE).

BACKGROUND

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The UE receives, on a primary cell, an activation command from a base station for activating a secondary cell between the UE and the base station. The UE receives scheduling information of a set of aperiodic tracking reference signals (TRSs). The UE receives a trigger indicating transmission of the set of aperiodic TRSs. The UE initiates a RF chain of the UE configured for the secondary cell in an interruption period. The UE receives, in response to receiving the trigger and in accordance with the scheduling information, the set of aperiodic TRSs on the secondary cell prior to receiving an initial periodic synchronization signal block (SSB) or an initial periodic TRS after the interruption period. The UE performs time and frequency tracking on the secondary cell based on the set of aperiodic TRSs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
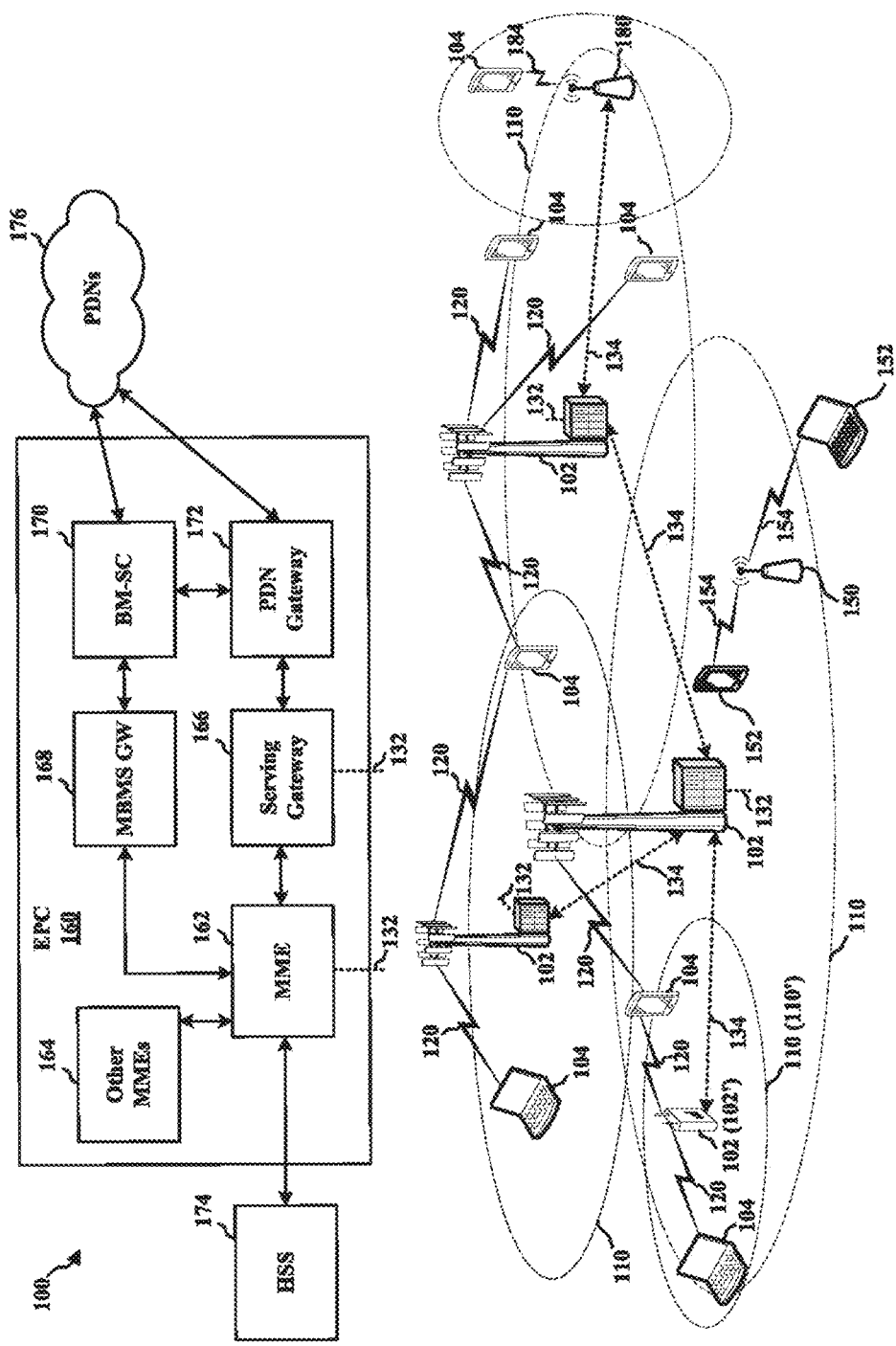
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the core network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station gNB 180 may utilize beamforming 184 with the UE 104 to compensate for the extremely high path loss and short range.

The core network 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the core network 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to PDNs 176. The PDNs 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
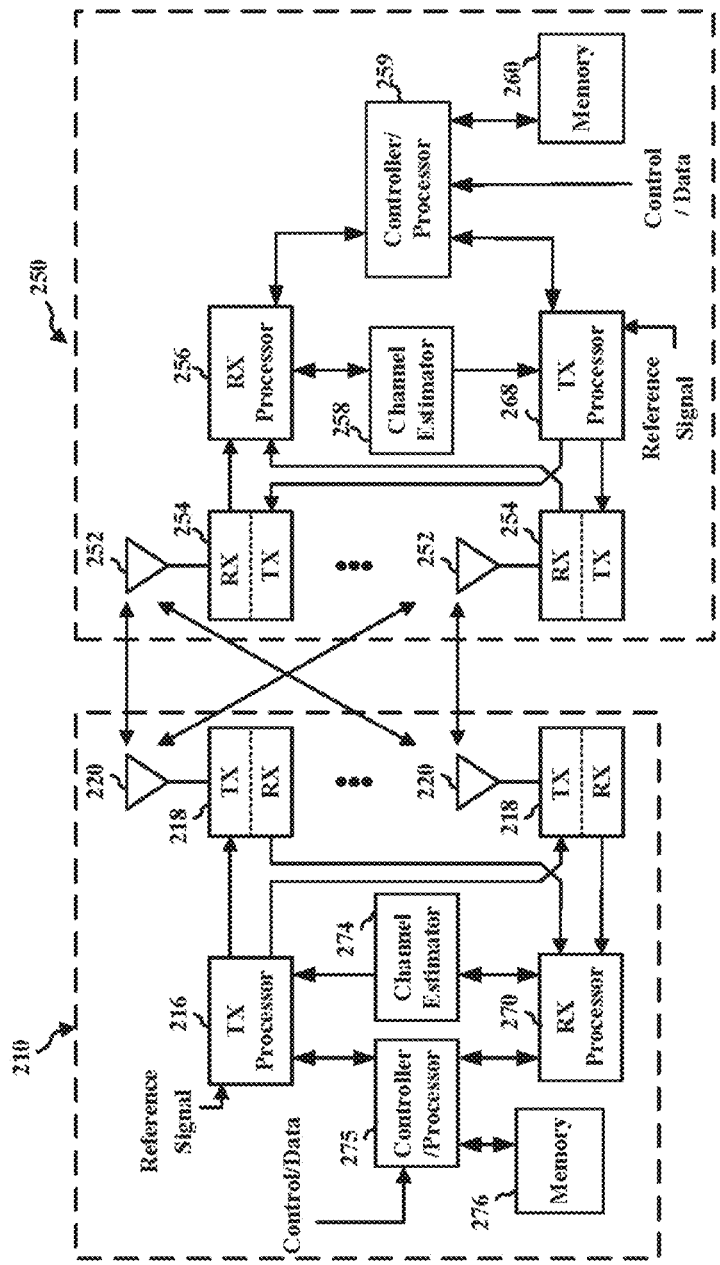
FIG. 2 is a diagram illustrating a base station in communication with a UE in an access network.

FIG. 2 is a block diagram of a base station 210 in communication with a UE 250 in an access network. In the DL, IP packets from the core network 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the core network 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the core network 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
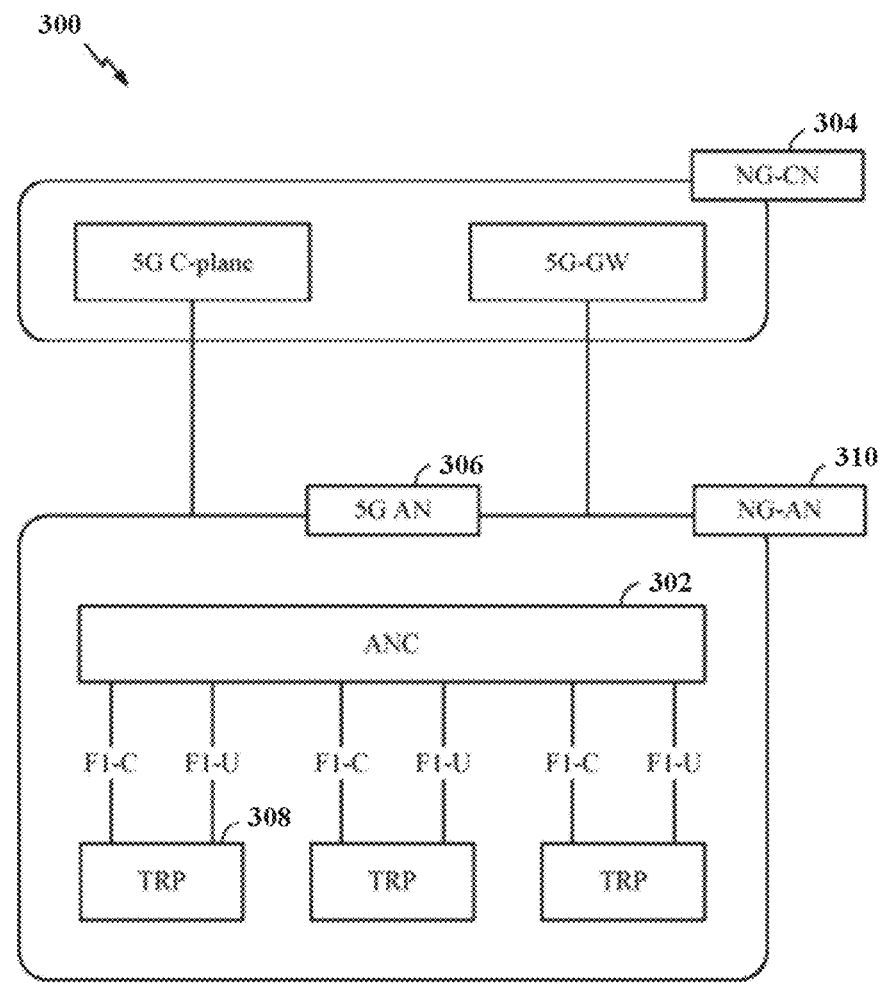
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
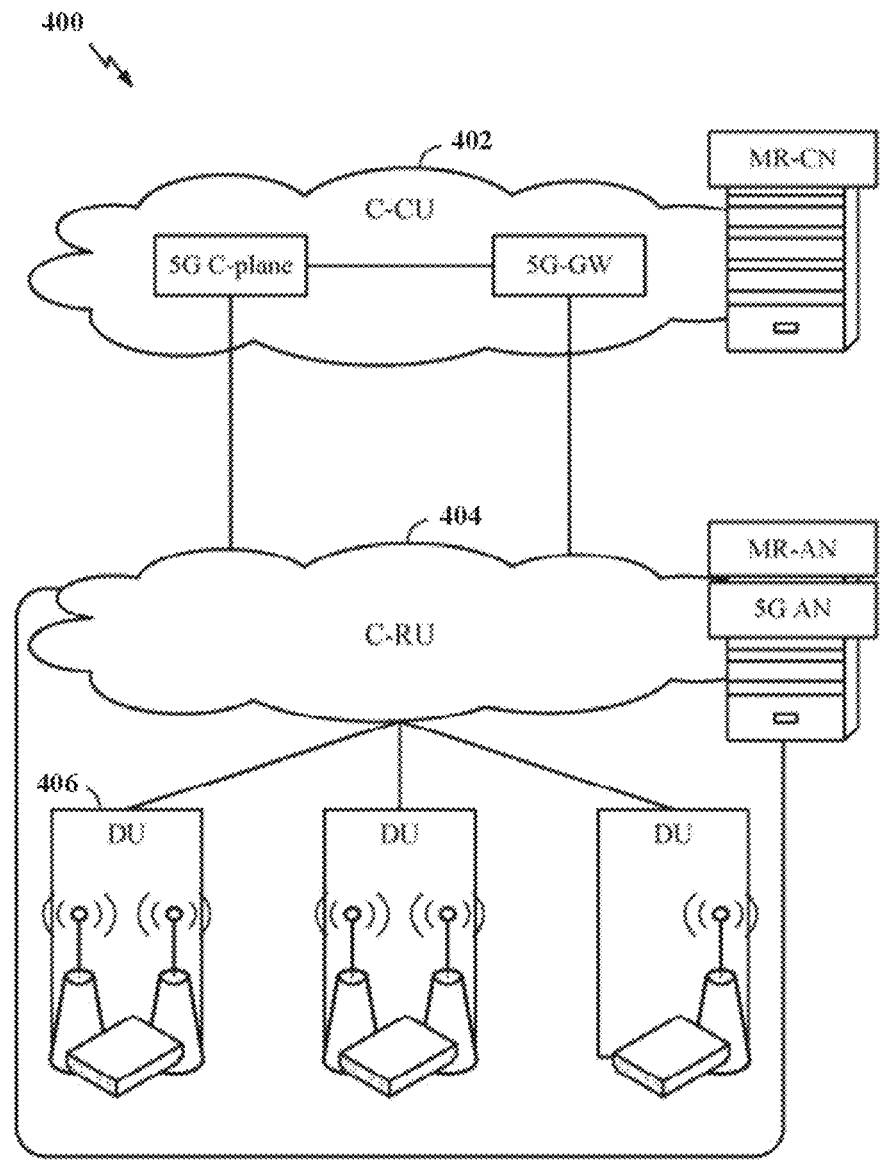
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
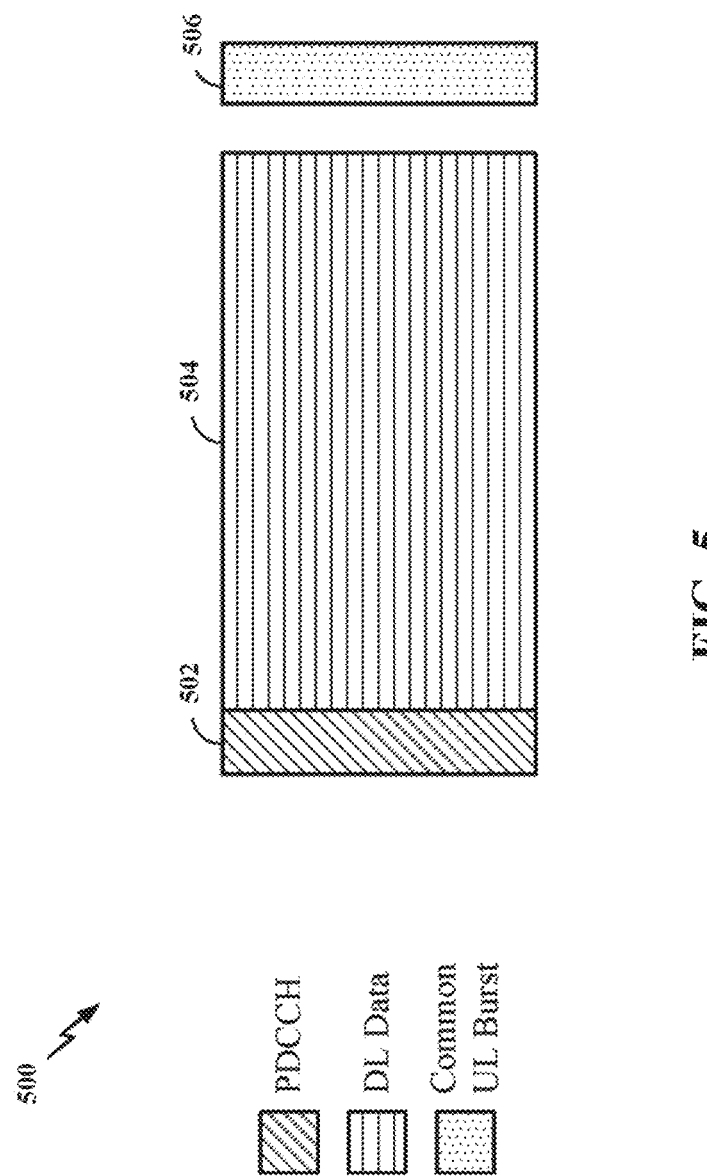
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
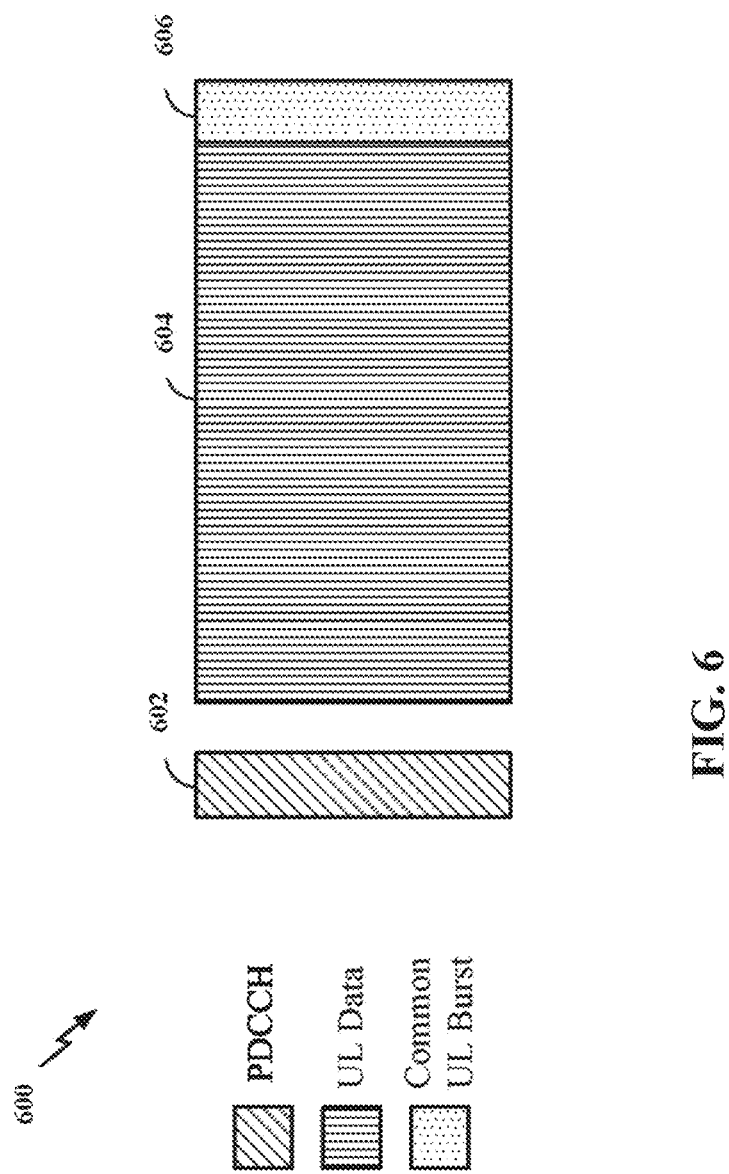
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In the present disclosure, one or more terms or features are defined or described in "3GPP TS 38.331 V15.6.0 (2019-06); Technical Specification; 3rd Generation Partnership Project; Technical Specification Group Radio Access Network; NR; Radio Resource Control (RRC) protocol specification; (Release 15)" (3GPP TS 38.331), which are expressly incorporated by reference herein in its entirety. Those terms and features are known by a person having ordinary skill in the art.

In NR, during a secondary cell (SCell) or a secondary cell group (SCG) activation, a UE performs fine time and frequency tracking by using periodic synchronization signal blocks (SSBs) from a base station. Further, periodic or aperiodic tracking reference signals (TRSs) from the base station can be utilized by the UE to perform fine time and frequency tracking. In certain configurations, the UE expects periodic TRSs to be present. The base station can send configuration information of the periodic TRSs to the UE by using a CSI-RS resource set through RRC messages. The TRSs can be considered as one kind of CSI-RSs for fine time/frequency tracking.

With periodic SS block and TRS in NR, if a secondary cell activation command is not aligned with transmission of a SSB or TRS burst, the UE cannot perform synchronization on the secondary cell until the UE detects either SSB or TRS burst.

Figure 7:
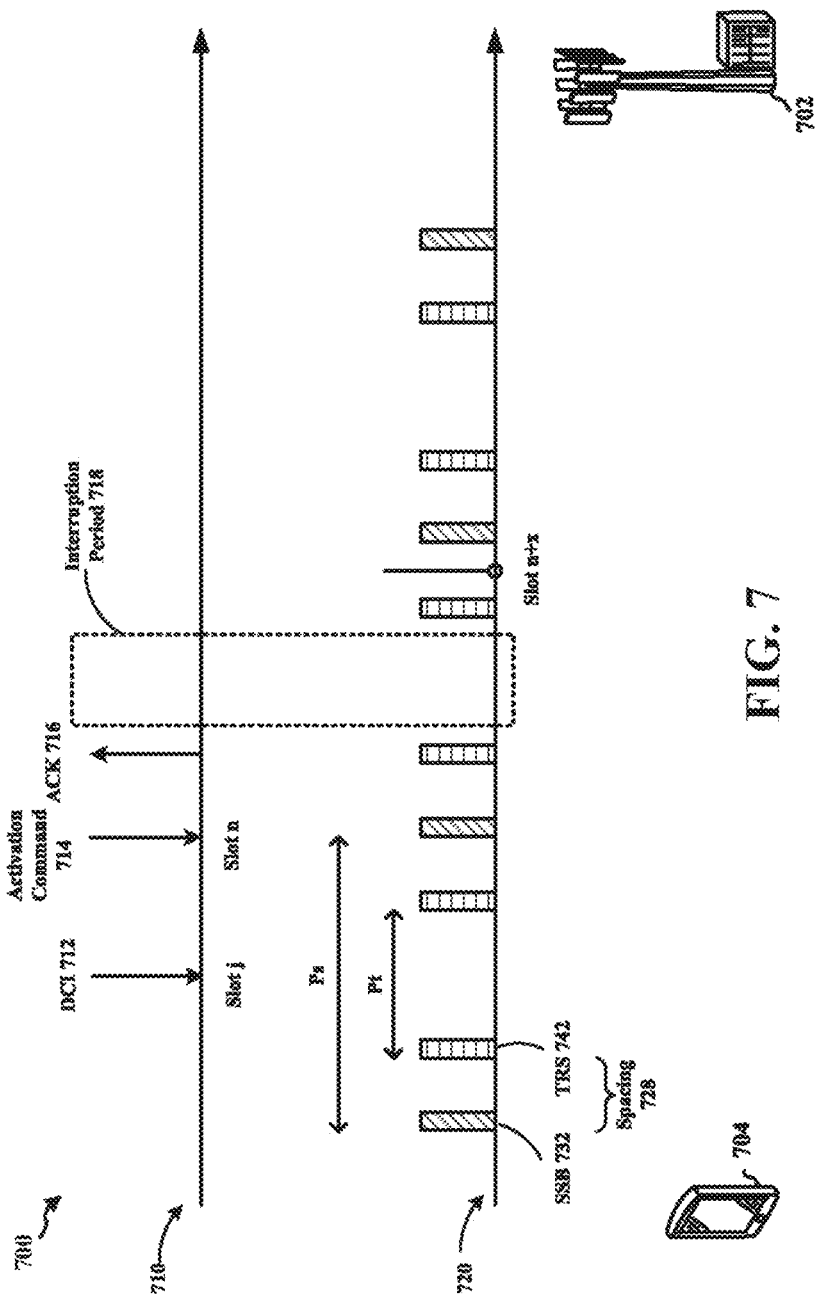
FIG. 7 is a diagram illustrating communication between a UE and a base station.

FIG. 7 is a diagram 700 illustrating communications between a base station 702 and a UE 704. The UE 704 has established communication with the base station 702 on a primary cell (PCell) 710. In a slot j, the UE 704 may receive DCI 712 in a PDCCH. The DCI 712 indicates resources allocated in a slot n for carrying an activation command 714 for a SCell 720 at the UE 704. For example, the activation command 714 may be carried in a Media Access Control (MAC) Control Element (CE) in a PDSCH of the slot n. Accordingly, the UE 704 receives the activation command 714 in the slot n. Subsequently, the UE 704 sends an acknowledgement 716 on the PCell 710 to the base station 702, acknowledging receipt of the activation command 714.

After sending the acknowledgement 716, the UE 704 enters into an interruption period 718, during which the UE 704 turns on or initiates an RF chain (see, e.g., FIG. 2) for transmission and reception of signals on the SCell 720. During this period, the RF chain may not be ready for signal transmission or reception on the SCell 720 and the initiation of the RF chain may interfere signal transmission and reception on the PCell 710. As such, the UE 704 is not expected to perform signal transmission or reception on the PCell 710 and the SCell 720 during the interruption period 718.

The base station 702 transmits periodic SSBs 732 and periodic TRSs 742 on the SCell 720. The periodic interval of the SSBs 732 is $P_s$, and the periodic interval of the TRSs 742 is $P_t$. The UE 704 may be configured to start detecting an SSB 732 or TRS 742 for synchronization in a slot (n+x), which is after the interruption period 718. x is a value assigned based on: the time required by the UE to decode the activation command 714 on the PCell 710, the time between acknowledgement 716 and the activation command 714 if the activation command 714 is carried through an MAC CE, and the time required by the UE to turn on RF chain for the SCell 720.

In a first technique, the base station 702 is configured to properly offset the SSBs 732 and the TRSs 742 to achieve a minimum spacing between any two bursts of signals. Further, the base station 702 also determine the timing for sending the activation command 714 on the PCell 710 in consideration a range of x values. For example, $P_s$ may be 20 ms; $P_t$ is 10 ms. The base station 702 staggers the SSBs 732 and the TRSs 742 such that a spacing 728 between a SSB 732 and a TRS 742 is 5 ms.

In some other techniques, the base station 702 may transmit a one-time, aperiodic TRS burst to assist the periodic synchronization signal blocks and the periodic TRSs. The properties of the aperiodic TRS burst may include one or more of: number of consecutive slots in the aperiodic TRS burst, the bandwidth (e.g., number of RBs) of the aperiodic TRS burst, a subcarrier spacing between two TRS resource elements (e.g., a transmission comb size) in an OFDM symbol; an OFDM symbol spacing between two TRS symbols in a slot. Those properties may be the same as or different from the properties of the periodic TRSs 742. Further, the assisted (aperiodic) TRS burst does not need to be triggered if one periodic TRS burst occurrence on the SCell 720 is close to the SCell activation command on the PCell 710.

Figure 8:
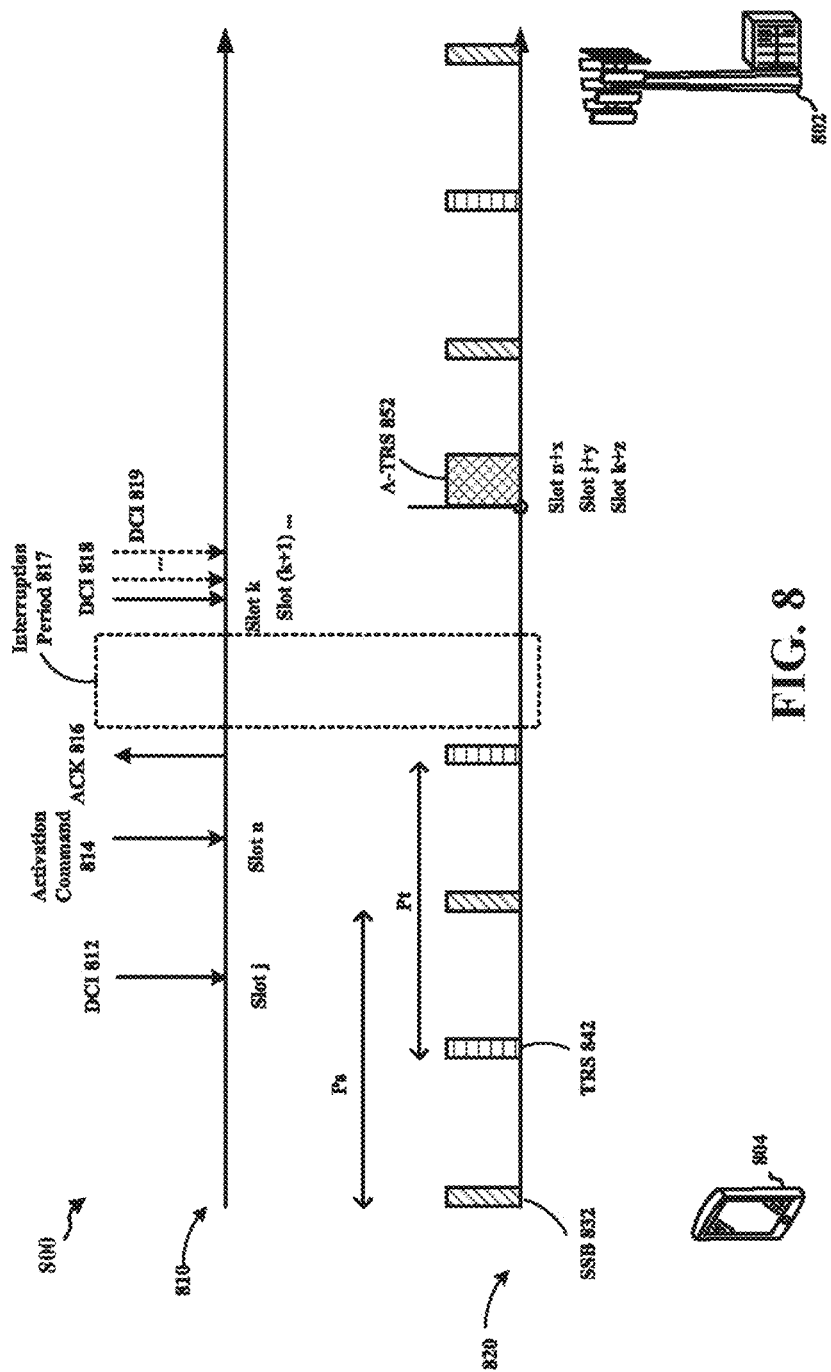
FIG. 8 is another diagram illustrating communication between a UE and a base station.

FIG. 8 is a diagram 800 illustrating communications between a base station 802 and a UE 804. In a second technique, in a slot j, the UE 804 may receive DCI 812 in a PDCCH on a PCell 810. The DCI 812 indicates resources allocated on the PCell 810 in a slot n for carrying an activation command 814 for activating a SCell 820 at the UE 804. For example, the activation command 814 may be carried in a MAC CE in a PDSCH of the slot n.

In certain configurations, the MAC CE carrying the activation command 814 in the slot n may also include a trigger indicating that an aperiodic TRS burst 852 is to be transmitted on the SCell 820 according to certain scheduling information.

In certain configurations, the MAC CE may also contain scheduling information of the aperiodic TRS burst 852. The scheduling information indicates a slot offset x from the slot carrying the trigger (e.g., the slot n). In other words, the aperiodic TRS burst 852 is scheduled to be transmitted on the SCell 820 starting from the slot (n+x). The base station 802 configures the value of x such that the slot (n+x) is subsequent to an interruption period 817 described infra. Further, the scheduling information also indicates the number of slots occupied by the aperiodic TRS burst 852. For example, two slots (i.e., the slot (n+x) and the slot (n+x+1)) may be used to carry the aperiodic TRS burst 852.

The UE 804 receives the activation command 814 and the scheduling information in the slot n. Subsequently, the UE 804 sends an acknowledgement 816 on the PCell 810 to the base station 802, acknowledging receipt of the activation command 814.

After sending the acknowledgement 816, the UE 804 enters into an interruption period 817. Similar to the interruption period 718 described supra, the UE 804 is not expected to perform signal transmission or reception on the PCell 810 and the SCell 820 during the interruption period 817.

The base station 802 transmits periodic SSBs 832 and periodic TRSs 842 on the SCell 820. The periodic interval of the SSBs 832 is $P_s$, and the periodic interval of the TRSs 842 is $P_t$. The base station 802 also transmits the aperiodic TRS burst 852 as indicated in the scheduling information. After receiving the trigger for the aperiodic TRS burst 852 on the PCell 810 in the slot n, the UE 804 starts detecting the aperiodic TRS burst 852 in the slot (n+x) on the SCell 820. Upon detecting the aperiodic TRS burst 852, the UE 804 performs time and frequency tracking on the secondary cell based on the aperiodic TRS burst 852.

In certain configurations, instead of being carried in the MAC CE as described supra in technique 2, the scheduling information is carried in another manner as described infra in accordance with techniques 3-5.

In a third technique, in certain configurations, the trigger indicating that the aperiodic TRS burst 852 is to be transmitted according to the scheduling information may be included in DCI received on the PCell 810 prior to the interruption period 817. For example, the DCI 812 scheduling the activation command 814 may also include the trigger. Further, the DCI may also include scheduling information. In this technique, the scheduling information includes a slot offset y from the slot carrying the DCI (e.g., the slot j carrying the DCI 812). In other words, the aperiodic TRS burst 852 is scheduled to be transmitted on the SCell 820 starting from the slot (j+y). The base station 802 configures the value of y such that the slot (j+y) is subsequent to an interruption period 817 described infra. Further, the scheduling information also indicates the number of slots occupied by the aperiodic TRS burst 852. For example, two slots (i.e., the slot (j+y) and the slot (j+y+1)) may be used to carry the aperiodic TRS burst 852. In particular, the value of y may be greater than 24. As such, the maximum values of a parameter aperiodic TriggeringOffset specified in 3GPP TS 38.331 V15.7.0 (2019-09) can be increased to be greater than 24. Alternatively, a new IE aperiodic TriggeringOffset TRS with a limit greater than 24 can be defined.

In certain configurations, instead of being carried in the DCI 812 as described supra in technique 3, the scheduling information is carried in another manner in accordance with technique 2 or, as described infra, in accordance with techniques 4-5.

In a fourth technique, in certain configurations, the trigger indicating that the aperiodic TRS burst 852 is to be transmitted according to the scheduling information may be included in a DCI 818 (instead of in the DCI 812) received on the PCell 810 in a slot k subsequent to the interruption period 817. Further, the scheduling information may be carried in the DCI 818, and may indicate a slot offset z from the slot k carrying the DCI 818 and the number of slots occupied by the aperiodic TRS burst 852. In other words, the aperiodic TRS burst 852 is scheduled to be transmitted on the SCell 820 starting from the slot (k+z).

Further, in addition to the DCI 818, the base station 802 may transmit DCI 819 on the PCell 810 in each slot of one or more slots following the slot k (i.e., slot (k+1) ... ). The DCI 819 in each slot may include the trigger indicating that the aperiodic TRS burst 852 is to be transmitted according to the scheduling information. The DCI 819 in each slot may also carry the scheduling information, which may indicate a slot offset from the slot k carrying that particular DCI 819 and the number of slots occupied by the aperiodic TRS burst 852. As such, upon decode the trigger and the scheduling information in any of the slots (e.g., slot k, slot (k+1), ... ), the UE 804 can start detecting the aperiodic TRS burst 852 on the SCell 820 accordingly.

In certain configurations, instead of being carried in the DCI 818 and the DCI 819 as described supra in technique 4, the scheduling information is carried in another manner in accordance with techniques 2-3 or, as described infra, in accordance with technique 5.

In a fifth technique, the base station 802 may transmit to the UE 804 on the PCell 810 the trigger indicating that the aperiodic TRS burst 852 is to be transmitted according to the scheduling information described supra according to techniques 2-4. The base station 802 transmits the scheduling information of the aperiodic TRS burst 852 through RRC parameters in an RRC message transmitted on the PCell 810. The scheduling information may indicate a slot offset from a slot carrying the trigger and the number of slots occupied by the aperiodic TRS burst 852.

Figure 9:
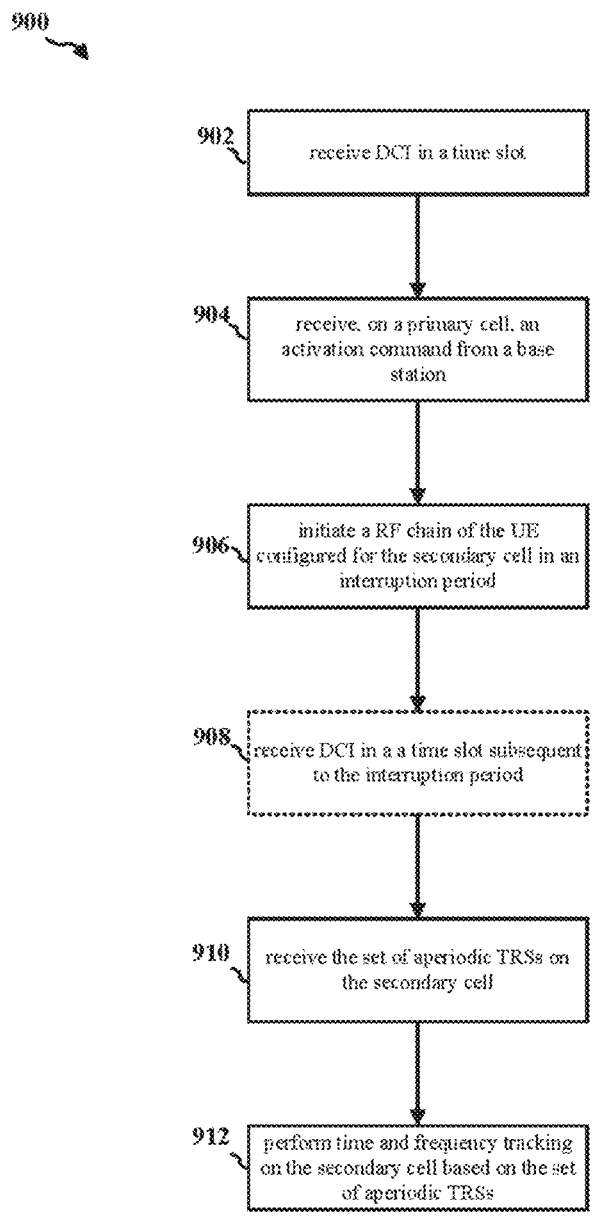
FIG. 9 is a flow chart a method (process) for activating a SCell.

FIG. 9 is a flow chart 900 of a method (process) for activating a SCell. The method may be performed by a UE (e.g., the UE 704, the apparatus 1002, and the apparatus 1002'). At operation 902, the UE receives DCI in a third time slot on a primary cell from a base station. The DCI indicates a MAC CE carrying an activation command for activating a secondary cell between the UE and the base station in a first time slot subsequent to the third time slot. In certain configurations, the DCI may further include a trigger indicating transmission of a set of aperiodic TRSs and scheduling information of the set of aperiodic TRSs. The set of aperiodic TRSs are to be received in one or more slots starting from a second time slot. The scheduling information includes an indication of an offset between the third time slot and the second time slot and an indication of a number of slots in the one or more slots.

At operation 904, the UE receives, on the primary cell, the activation command from the base station in the first time slot. In certain configurations, the trigger is also received in the first time slot. The activation command and the trigger may be carried in a Media Access Control (MAC) Control Element (CE) in the first time slot. The scheduling information includes an indication of an offset between the first time slot and the second time slot and an indication of the number of slots in the one or more slots. In certain configurations, the MAC CE further includes the scheduling information. In certain configurations, the MAC CE further includes the indication of the offset. The indication of the number of slots in the one or more slots is received through a Radio Resource Control (RRC) message sent from the base station.

At operation 906, the UE initiates a RF chain of the UE configured for the secondary cell in an interruption period. In certain configurations, the UE may, at operation 908, receive DCI in a fourth time slot subsequent to the interruption period and prior to the second time slot on the primary cell. The DCI may include the trigger and the scheduling information. The scheduling information includes an indication of an offset between the fourth slot and the second time slot and an indication of the number of slots in the one or more slots. In certain configurations, the UE receives, on the primary cell, respective DCI in each slot of a plurality of time slots subsequent to the interruption period and prior to the second time slot. The respective DCI in each slot of the plurality of slots includes the trigger and respective scheduling information. The respective scheduling information in the each slot includes an indication of an offset between the each slot and the second time slot and an indication of the number of slots in the one or more slots.

At operation 910, the UE receives, in response to receiving the trigger and in accordance with the scheduling information, the set of aperiodic TRSs on the secondary cell prior to receiving an initial periodic synchronization signal block (SSB) or an initial periodic TRS after the interruption period. At operation 912, the UE performs time and frequency tracking on the secondary cell based on the set of aperiodic TRSs.

In certain configurations, the trigger is carried in at least one of: a Media Access Control (MAC) Control Element (CE) that also carries the activation command, downlink control information that is received prior to receiving the activation command and that indicates resources allocated to the activation command, downlink control information that is received subsequent the interruption period, and downlink control information that is received in each slot of a plurality of slots subsequent to the interruption period.

In certain configurations, the scheduling information is carried in at least one of: a MAC CE that also carries the activation command, downlink control information that is received prior to receiving the activation command and that indicates resources allocated to the activation command, downlink control information that is received subsequent the interruption period, downlink control information that is received in each slot of a plurality of slots subsequent to the interruption period, and a RRC message sent from the base station.

In certain configurations, the scheduling information includes (a) an indication of an offset between a slot in which the trigger is transmitted and a slot starting from which the set of aperiodic TRSs is transmitted and (b) an indication of a number of slots occupied by the set of aperiodic TRSs.

Figure 10:
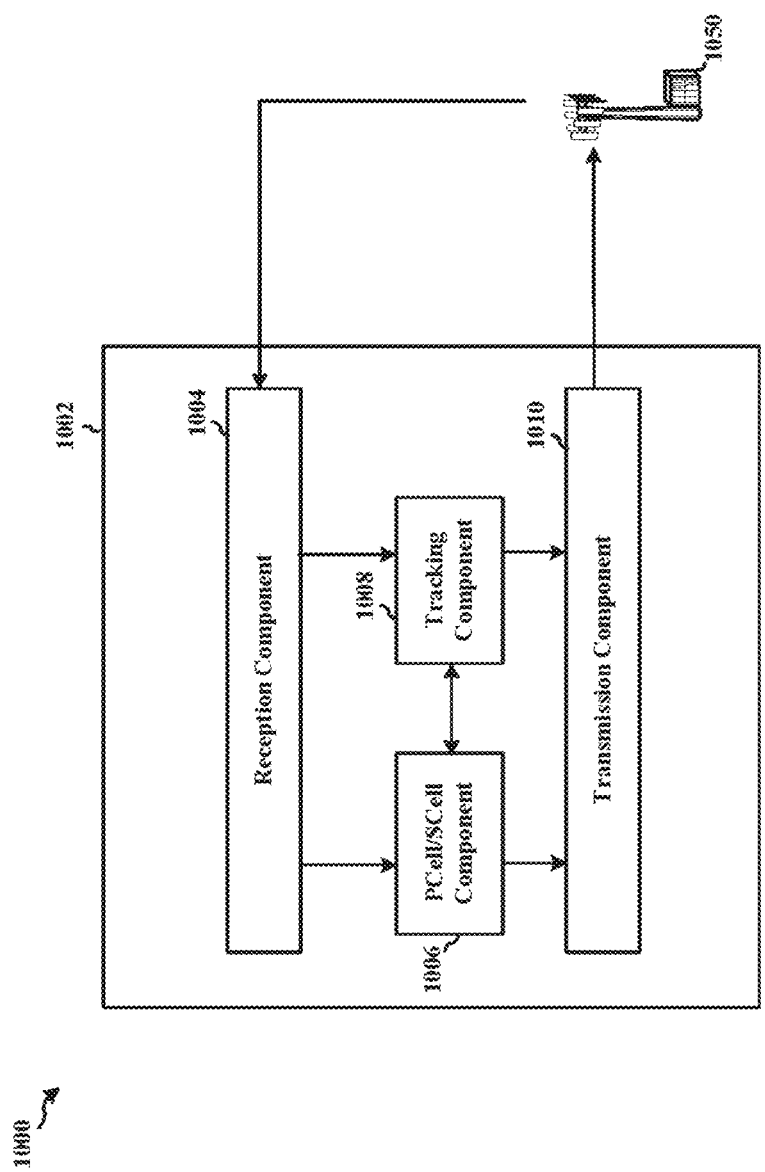
FIG. 10 is a conceptual data flow diagram illustrating the data flow between different components/means in an exemplary apparatus.

FIG. 10 is a conceptual data flow diagram 1000 illustrating the data flow between different components/means in an exemplary apparatus 1002. The apparatus 1002 may be a UE. The apparatus 1002 includes a reception component 1004, a PCell/SCell component 1006, a tracking component 1008, and a transmission component 1010.

The PCell/SCell component 1006 receives DCI in a third time slot on a primary cell from a base station. The DCI indicates a MAC CE carrying an activation command for activating a secondary cell between the UE and the base station in a first time slot subsequent to the third time slot. In certain configurations, the DCI may further include a trigger indicating transmission of a set of aperiodic TRSs and scheduling information of the set of aperiodic TRSs. The set of aperiodic TRSs are to be received in one or more slots starting from a second time slot. The scheduling information includes an indication of an offset between the third time slot and the second time slot and an indication of a number of slots in the one or more slots.

The PCell/SCell component 1006 receives, on the primary cell, the activation command from the base station in the first time slot. In certain configurations, the trigger is also received in the first time slot. The activation command and the trigger may be carried in a MAC CE in the first time slot. The scheduling information includes an indication of an offset between the first time slot and the second time slot and an indication of the number of slots in the one or more slots. In certain configurations, the MAC CE further includes the scheduling information. In certain configurations, the MAC CE further includes the indication of the offset. The indication of the number of slots in the one or more slots is received through a RRC message sent from the base station.

The PCell/SCell component 1006 initiates a RF chain of the UE configured for the secondary cell in an interruption period. In certain configurations, the PCell/SCell component 1006 receives, on the primary cell, respective DCI in each slot of a plurality of time slots subsequent to the interruption period and prior to the second time slot. The respective DCI in each slot of the plurality of slots includes the trigger and respective scheduling information. The respective scheduling information in the each slot includes an indication of an offset between the each slot and the second time slot and an indication of the number of slots in the one or more slots.

The tracking component 1008 receives, in response to receiving the trigger and in accordance with the scheduling information, the set of aperiodic TRSs on the secondary cell prior to receiving an initial periodic SSB or an initial periodic TRS after the interruption period. The tracking component 1008 performs time and frequency tracking on the secondary cell based on the set of aperiodic TRSs.

In certain configurations, the trigger is carried in at least one of: a Media Access Control (MAC) Control Element (CE) that also carries the activation command, downlink control information that is received prior to receiving the activation command and that indicates resources allocated to the activation command, downlink control information that is received subsequent the interruption period, and downlink control information that is received in each slot of a plurality of slots subsequent to the interruption period.

In certain configurations, the scheduling information is carried in at least one of: a MAC CE that also carries the activation command, downlink control information that is received prior to receiving the activation command and that indicates resources allocated to the activation command, downlink control information that is received subsequent the interruption period, downlink control information that is received in each slot of a plurality of slots subsequent to the interruption period, and a RRC message sent from the base station.

In certain configurations, the scheduling information includes (a) an indication of an offset between a slot in which the trigger is transmitted and a slot starting from which the set of aperiodic TRSs is transmitted and (b) an indication of a number of slots occupied by the set of aperiodic TRSs.

Figure 11:
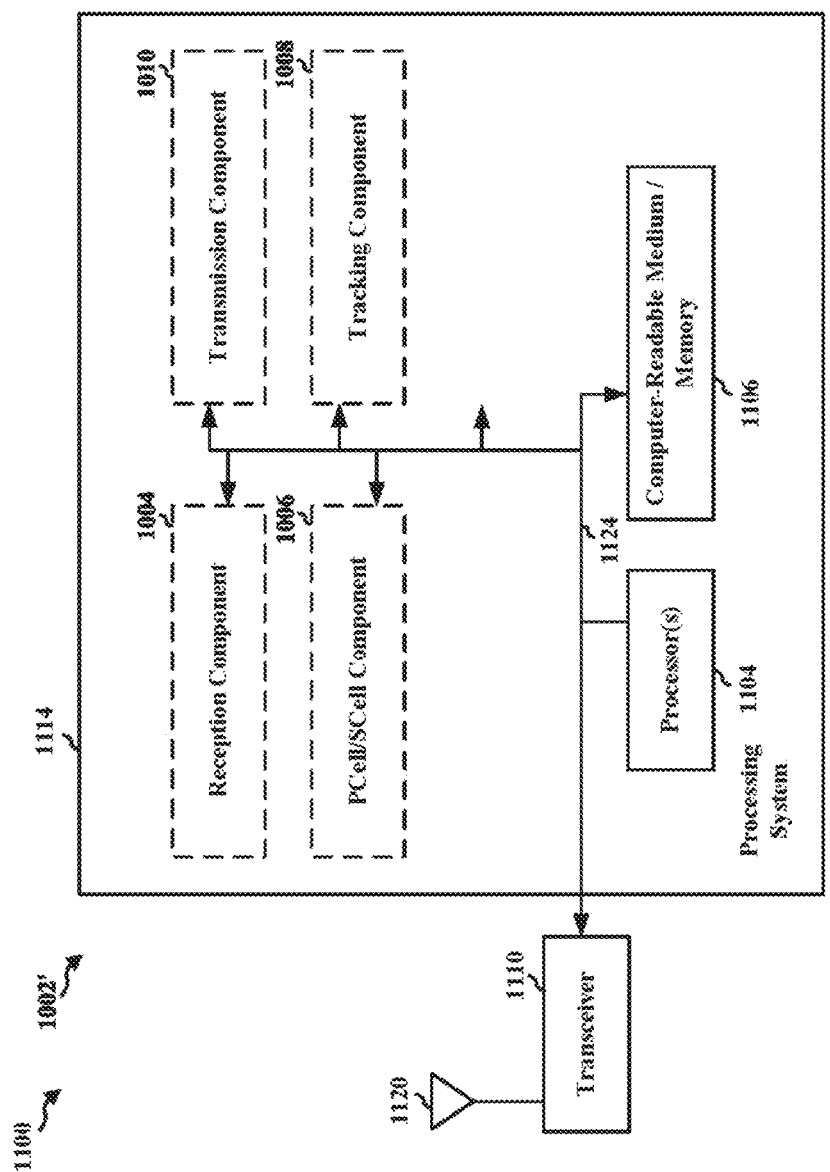
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The apparatus 1002' may be a UE. The processing system 1114 may be implemented with a bus architecture, represented generally by a bus 1124. The bus 1124 may include any number of interconnecting buses and bridges depending on the specific application of the processing system 1114 and the overall design constraints. The bus 1124 links together various circuits including one or more processors and/or hardware components, represented by one or more processors 1104, the reception component 1004, the PCell/SCell component 1006, the tracking component 1008, and a computer-readable medium/memory 1106. The bus 1124 may also link various other circuits such as timing sources, peripherals, voltage regulators, and power management circuits, etc.

The processing system 1114 may be coupled to a transceiver 1110, which may be one or more of the transceivers 254. The transceiver 1110 is coupled to one or more antennas 1120, which may be the communication antennas 252.

The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120.

The processing system 1114 includes one or more processors 1104 coupled to a computer-readable medium/memory 1106. The one or more processors 1104 are responsible for general processing, including the execution of software stored on the computer-readable medium/memory 1106. The software, when executed by the one or more processors 1104, causes the processing system 1114 to perform the various functions described supra for any particular apparatus. The computer-readable medium/memory 1106 may also be used for storing data that is manipulated by the one or more processors 1104 when executing software. The processing system 1114 further includes at least one of the reception component 1004, the PCell/SCell component 1006, and the tracking component 1008. The components may be software components running in the one or more processors 1104, resident/stored in the computer readable medium/memory 1106, one or more hardware components coupled to the one or more processors 1104, or some combination thereof. The processing system 1114 may be a component of the UE 250 and may include the memory 260 and/or at least one of the TX processor 268, the RX processor 256, and the communication processor 259.

In one configuration, the apparatus 1002/apparatus 1002' for wireless communication includes means for performing each of the operations of FIG. 8. The aforementioned means may be one or more of the aforementioned components of the apparatus 1002 and/or the processing system 1114 of the apparatus 1002' configured to perform the functions recited by the aforementioned means.

As described supra, the processing system 1114 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication of a user equipment (UE), comprising:
receiving, on a primary cell, an activation command from a base station for activating a secondary cell between the UE and the base station;
receiving scheduling information of a set of aperiodic tracking reference signals (TRSs); receiving a trigger indicating transmission of the set of aperiodic TRSs;
initiating a RF chain of the UE configured for the secondary cell in an interruption period;
receiving, in response to receiving the trigger and in accordance with the scheduling information, the set of aperiodic TRSs on the secondary cell prior to receiving an initial periodic synchronization signal block (SSB) or an initial periodic TRS after the interruption period; and;
performing time and frequency tracking on the secondary cell based on the set of aperiodic TRSs.

2. The method of claim 1, wherein the trigger is carried in at least one of: a Media Access Control (MAC) Control Element (CE) that also carries the activation command;
downlink control information that is received prior to receiving the activation command and that indicates resources allocated to the activation command;
downlink control information that is received subsequent the interruption period; and
downlink control information that 1s received in each slot of a plurality of slots subsequent to the interruption period.

3. The method of claim 1, wherein the scheduling information is carried in at least one of: a Media Access Control (MAC) Control Element (CE) that also carries the activation command; downlink control information that is received prior to receiving the activation command and that indicates resources allocated to the activation command;
downlink control information that is received subsequent the interruption period;
downlink control information that 1s received in each slot of a plurality of slots subsequent to the interruption period; and
a Radio Resource Control (RRC) message sent from the base station.

4. The method of claim 1, wherein the scheduling information includes (a) an indication of an offset between a slot in which the trigger is transmitted and a slot starting from which the set of aperiodic TRSs is transmitted and (b) an indication of a number of slots occupied by the set of aperiodic TRSs.

5. The method of claim 1, wherein the activation command 1s received in a first time slot prior to the interruption period, wherein the set of aperiodic TRSs are received in one or more slots starting from a second time slot.

6. The method of claim 5, wherein the activation command and the trigger are carried in a Media Access Control (MAC) Control Element (CE) in the first time slot, wherein the scheduling information includes an indication of an offset between the first time slot and the second time slot and an indication of the number of slots in the one or more slots.

7. The method of claim 6, wherein the MAC CE further includes the scheduling information.

8. The method of claim 6, wherein the MAC CE further includes the indication of the offset, wherein the indication of the number of slots in the one or more slots is received through a Radio Resource Control (RRC) message sent from the base station.

9. The method of claim 5, further comprising: receiving downlink control information (DCI) in a third time slot prior to the first time slot on the primary cell, wherein the DCI indicates a Media Access Control (MAC) Control Element (CE) carrying the activation command in the first time slot, wherein the DCI further includes the trigger and the scheduling information, wherein the scheduling information includes an indication of an offset between the third time slot and the second time slot and an indication of the number of slots in the one or more slots.

10. The method of claim 5, further comprising: receiving downlink control information (DCI) in a fourth time slot subsequent to the interruption period and prior to the second time slot on the primary cell, wherein the DCI includes the trigger and the scheduling information, wherein the scheduling information includes an indication of an offset between the fourth slot and the second time slot and an indication of the number of slots in the one or more slots.

11. The method of claim 5, further comprising: receiving, on the primary cell, respective downlink control information (DCI) in each slot of a plurality of time slots subsequent to the interruption period and prior to the second time slot, wherein the respective DCI in each slot of the plurality of slots includes the trigger and respective scheduling information, wherein the respective scheduling information in the each slot includes an indication of an offset between the each slot and the second time slot and an indication of the number of slots in the one or more slots.

12. An apparatus for wireless communication, the apparatus being a user equipment (UE), comprising: a memory; and
at least one processor coupled to the memory and configured to:
receive, on a primary cell, an activation command from a base station for activating a secondary cell between the UE and the base station;
receive scheduling information of a set of aperiodic tracking reference signals (TRSs); receive a trigger indicating transmission of the set of aperiodic TRSs;
initiate a RF chain of the UE configured for the secondary cell in an interruption period;
receive, in response to receiving the trigger and in accordance with the scheduling information, the set of aperiodic TRSs on the secondary cell prior to receiving an initial periodic synchronization signal block (SSB) or an initial periodic TRS after the interruption period; and
perform time and frequency tracking on the secondary cell based on the set of aperiodic TRSs.

13. The apparatus of claim 12, wherein the trigger is carried in at least one of: a Media Access Control (MAC) Control Element (CE) that also carries the activation command;
downlink control information that is received prior to receiving the activation command and that indicates resources allocated to the activation command;
downlink control information that is received subsequent the interruption period; and
downlink control information that 1s received in each slot of a plurality of slots subsequent to the interruption period.

14. The apparatus of claim 12, wherein the scheduling information is carried in at least one of: a Media Access Control (MAC) Control Element (CE) that also carries the activation command; downlink control information that is received prior to receiving the activation command and that indicates resources allocated to the activation command; downlink control information that is received subsequent the interruption period; 25 downlink control information that 1s received in each slot of a plurality of slots subsequent to the interruption period; and a Radio Resource Control (RRC) message sent from the base station.

15. The apparatus of claim 12, wherein the scheduling information includes (a) an indication of an offset between a slot in which the trigger is transmitted and a slot starting from which the set of aperiodic TRSs is transmitted and (b) an indication of a number of slots occupied by the set of aperiodic TRSs.

16. The apparatus of claim 12, wherein the activation command is received in a first time slot prior to the interruption period, wherein the set of aperiodic TRSs are received in one or more slots starting from a second time slot.

17. The apparatus of claim 16, wherein the activation command and the trigger are carried in a 5 Media Access Control (MAC) Control Element (CE) in the first time slot, wherein the scheduling information includes an indication of an offset between the first time slot and the second time slot and an indication of the number of slots in the one or more slots.

18. The apparatus of claim 17, wherein the MAC CE further includes the scheduling information.

19. The apparatus of claim 17, wherein the MAC CE further includes the indication of the offset, 10 wherein the indication of the number of slots in the one or more slots is received through a Radio Resource Control (RRC) message sent from the base station.

20. A Non-transitory computer readable storage medium storing a computer executable code for wireless communication of a user equipment (UE), for executing to: receive, on a primary cell, an activation command from a base station for activating a secondary cell between the UE and the base station;
receive scheduling information of a set of aperiodic tracking reference signals (TRSs);
receive a trigger indicating transmission of the set of aperiodic TRSs;
initiate a RF chain of the UE configured for the secondary cell in an interruption period; receive, in response to receiving the trigger and in accordance with the scheduling information, 20 the set of aperiodic TRSs on the secondary cell prior to receiving an initial periodic synchronization signal block (SSB) or an initial periodic TRS after the interruption period; and
perform time and frequency tracking on the secondary cell based on the set of aperiodic TRSs.

* * * * *